United States Patent
Dolhansky et al.

(10) Patent No.: US 10,810,725 B1
(45) Date of Patent: Oct. 20, 2020

(54) AUTOMATED DETECTION OF TAMPERED IMAGES

(71) Applicant: Facebook, Inc., Menlo Park, CA (US)

(72) Inventors: Brian Dolhansky, Seattle, WA (US); Cristian Canton Ferrer, Sammamish, WA (US); Eric Erkon Hsin, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 51 days.

(21) Appl. No.: 16/213,667

(22) Filed: Dec. 7, 2018

(51) Int. Cl.
| | | |
|---|---|---|
| *G06T 7/00* | (2017.01) | |
| *G06K 9/62* | (2006.01) | |
| *G06T 9/00* | (2006.01) | |
| *G06K 9/46* | (2006.01) | |

(52) U.S. Cl.
CPC .............. *G06T 7/0002* (2013.01); *G06K 9/46* (2013.01); *G06K 9/6257* (2013.01); *G06T 9/002* (2013.01); *G06K 2209/27* (2013.01); *G06T 2207/20084* (2013.01); *G06T 2207/30196* (2013.01)

(58) Field of Classification Search
CPC .............................. G06T 19/006; G06K 9/481
USPC .............. 382/224, 100, 255, 311, 167, 276; 367/53
See application file for complete search history.

(56) References Cited

U.S. PATENT DOCUMENTS

| | | | | |
|---|---|---|---|---|
| 2015/0078661 | A1* | 3/2015 | Granados | G06T 5/009 |
| | | | | 382/167 |
| 2018/0046649 | A1* | 2/2018 | Dal Mutto | G06N 3/02 |
| 2018/0129893 | A1* | 5/2018 | Son | G06K 9/6256 |
| 2019/0073560 | A1* | 3/2019 | Matei | G06K 9/6271 |
| 2019/0138902 | A1* | 5/2019 | Matveev | G06N 3/084 |
| 2020/0034977 | A1* | 1/2020 | Ide | G06K 9/6256 |

OTHER PUBLICATIONS

Bayer, B. et al., "Constrained Convolutional Neural Networks: A New Approach Towards General Purpose Image Manipulation Detection," *IEEE Transactions on Information Forensics and Security*, Nov. 2018, pp. 2691-2706, vol. 13, No. 11.

Zach, F. et al., "Automated Image Forgery Detection through Classification of JPEG Ghosts," 2012, *Pattern Recognition, DAGM/OAGM 2012, Lecture Notes in Computer Science*, pp. 185-194, vol. 7476, Springer-Verlag, Berlin Heidelberg, Germany.

* cited by examiner

*Primary Examiner* — Kiet M Doan
(74) *Attorney, Agent, or Firm* — Fenwick & West LLP

(57) ABSTRACT

A content analyzer determines whether various types of modification have been made to images. The content analyzer computes JPEG ghosts from the images that are concatenated with the image channels to generate a feature vector. The feature vector is provided as input to a neural network that determines whether the types of modification have been made to the image. The neural network may include a constrained convolution layer and several unconstrained convolution layers. An image fake model may also be applied to determine whether the image was generated using a computer model or algorithm.

16 Claims, 6 Drawing Sheets

| 620A | 620B | 620C |
| --- | --- | --- |
| 620D | 610 | 620E |
| 620F | 620G | 620H |

AUTOMATED DETECTION OF TAMPERED IMAGES

BACKGROUND

This disclosure relates generally to image analysis and, in particular, to detecting images that have been modified or faked.

Content editing technology has become increasingly advanced and widely available. For example, professional grade photo editing suites are available at prices affordable to amateur users, and the functionality of freely available photo editing software has improved greatly over recent years. Furthermore, machine learning techniques for automatically creating fake or significantly altered images are developing rapidly. In other words, individuals increasingly have the ability to fake or modify images in ways that may not be apparent to a typical person.

At the same time, the Internet has provided numerous ways for people to share images, videos, and other digital content. Social networks and other content sharing websites enable users to share large amounts of content to potentially huge audiences. Given the volume of content shared through such websites, it is impractical for all shared content to be analyzed manually. It is also generally impractical for end users to determine whether content has been modified, particularly where advanced modification techniques were used that may require significant skill and time to detect. Furthermore, with advanced faking techniques, manual detection may be exceedingly difficult, even for experts.

SUMMARY

A content analyzer determines whether various types of modification have been made to images. In various embodiments, the content analyzer computes one or more JPEG ghosts from an input image and a feature vector is generated by concatenating the JPEG ghosts with the channels of the input image. The feature vector is provided as input to a neural network that generates predictions of whether one or more types of modification have been made to the image. For example, the neural network might predict whether the image has been modified by: adding text, being made into a meme, blurring, object insertion, and/or requantization. In one embodiment, the neural network includes a constrained convolution layer and four unconstrained convolution layers.

Additionally or alternatively, an image fake model may be applied to determine whether the input image was generated using a computer model or algorithm, such as a deep fake algorithm. As the content analyzer is unlikely to have access to the computer models or algorithms used to generate fake images, an alternative approach is adopted to generate training data for the model. In various embodiments, a plurality of autoencoders are trained to generate fake images. Each autoencoder includes a first decoder and a second decoder. The first decoder is trained to generate images incorporating features of a first person into images of a second person (e.g., to put the face of the first person on the body of the second person) and the second decoder is trained to generate images incorporating features of the second person into images of the first person (e.g., to put the face of the second person on the body of the first person). The image fake model is trained to identify fake images using training images generated by the autoencoders.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

There are many types of modification a person may make to an image. Some modifications are benign (e.g., increasing the image contrast) while others are malicious (e.g., inserting someone into an image to falsely suggest they were present at the depicted event). Other modifications fall somewhere between these extremes. For example, adding text to an image to make a meme may result in a harmless joke or may create a misleading impression of a public figure, depending on the specific image and text.

In various embodiments, a content analyzer applies a neural network to identify whether various types of modification have been made to images. AS used herein, "image modification" generally refers to changes made to an image by a person using image editing software. However, in some embodiments, the modified image detector 310 may also identify other types of modification, such as changes introduced by data corruption. The neural network may be trained to identify additional types of modification using training data including positive examples (images in which the type of modification has been made) and negative examples (images where the type of modification has not been made). Based on the type or types of modification detected, the content analyzer may take various actions, such as tagging the images with metadata identifying the types of modifications detected. If a certain type or combination of types of medication are detected, the content analyzer may flag the image for human review.

The content analyzer may also apply a model trained to detect fake images. The term fake image is used herein to refer to an image artificially generated using a computer model or algorithm. One example is those created using a "deepfake" algorithm, which uses a neural network to superimpose one person's face onto another person's body. As another example, a similar algorithm might use a neural network to artificially change the pose of an individual in an image. Although such a fake involves modifying an image, the term "fake image" is used to distinguish such computer-generated modifications from those made using photo editing software.

Various embodiments are discussed below in which the content analyzer is part of a social network or other content sharing website. However, the content analyzer may also be a stand-alone system. For example, the content analyzer may be provided as a software application that individuals can install on a computer and apply to images they download from the Internet (or otherwise acquire).

System Architecture

Figure 1:
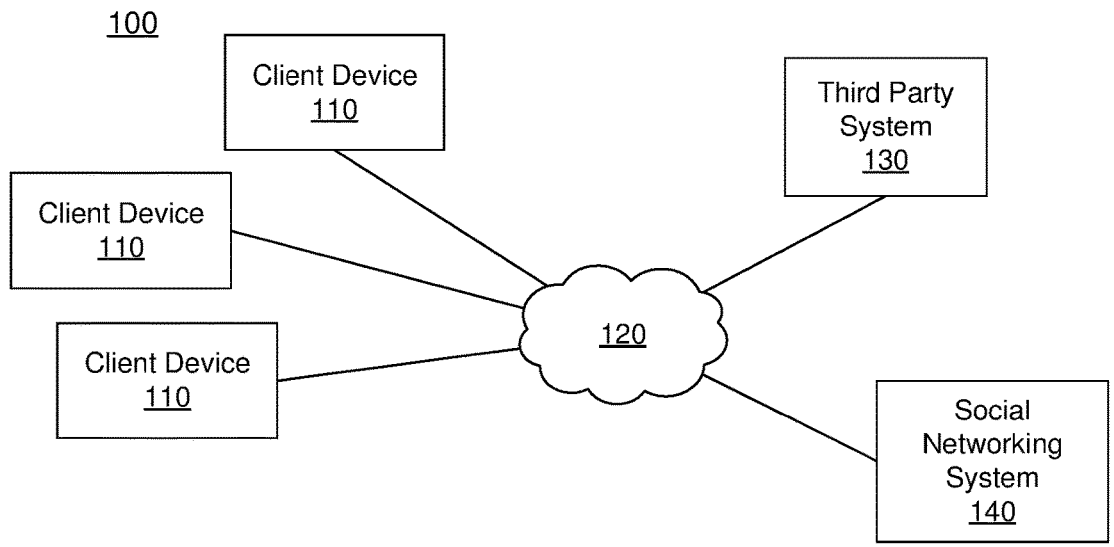
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 140, such as advertisements, content, or information about an application provided by the third-party system 130.

Figure 2:
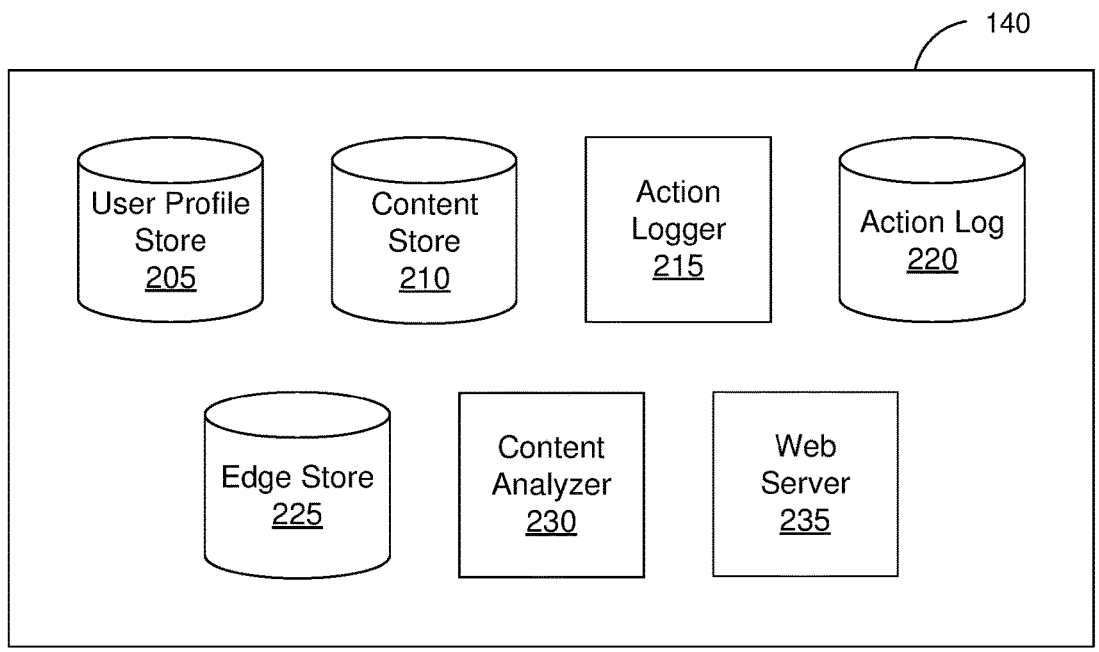
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content analyzer 230, and a web server 235. In other embodiments, the online system 140 may include additional, fewer, or different components for various applications. Components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third-party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content analyzer 230 analyzes content (e.g., images in the content store 210) to identify content that has been modified or faked. The content analyzer 230 may automatically analyze images when they are uploaded to the online system 140. Alternatively, the content analyzer 230 may periodically analyze some or all of the images in the content store 210. The content analyzer 230 may also analyze specified images on request. In one embodiment, the content analyzer 230 identifies types of modification that have been made to an image (e.g., added text, inserted image patches, cropping, contrast changes, brightness changes, color changes, etc.) and/or whether the image was artificially generated using a computer model or algorithm. Metadata may be added to the images indicating the results of the image analysis. Additionally or alternatively, an image may be deleted or otherwise made inaccessible to users if certain criteria are met. For example, the operator of the online system 140 may elect to disallow fake images created by a computer model or algorithm and remove them immediately on detection. The content analyzer 230 is described in greater detail below, with reference to FIGS. 3 through 7.

The web server 235 links the online system 140 via the network 120 to the one or more client devices 110, as well as to the one or more third-party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. In some embodiments, images or videos uploaded to the webserver are automatically analyzed by the content analyzer 230 to determine whether they have been modified or faked. Additionally, the web server 235 may provide application programming interface (API) functionality to send data directly to native client device operating systems, such as IOS®, ANDROID™, or BlackberryOS.

Figure 3:
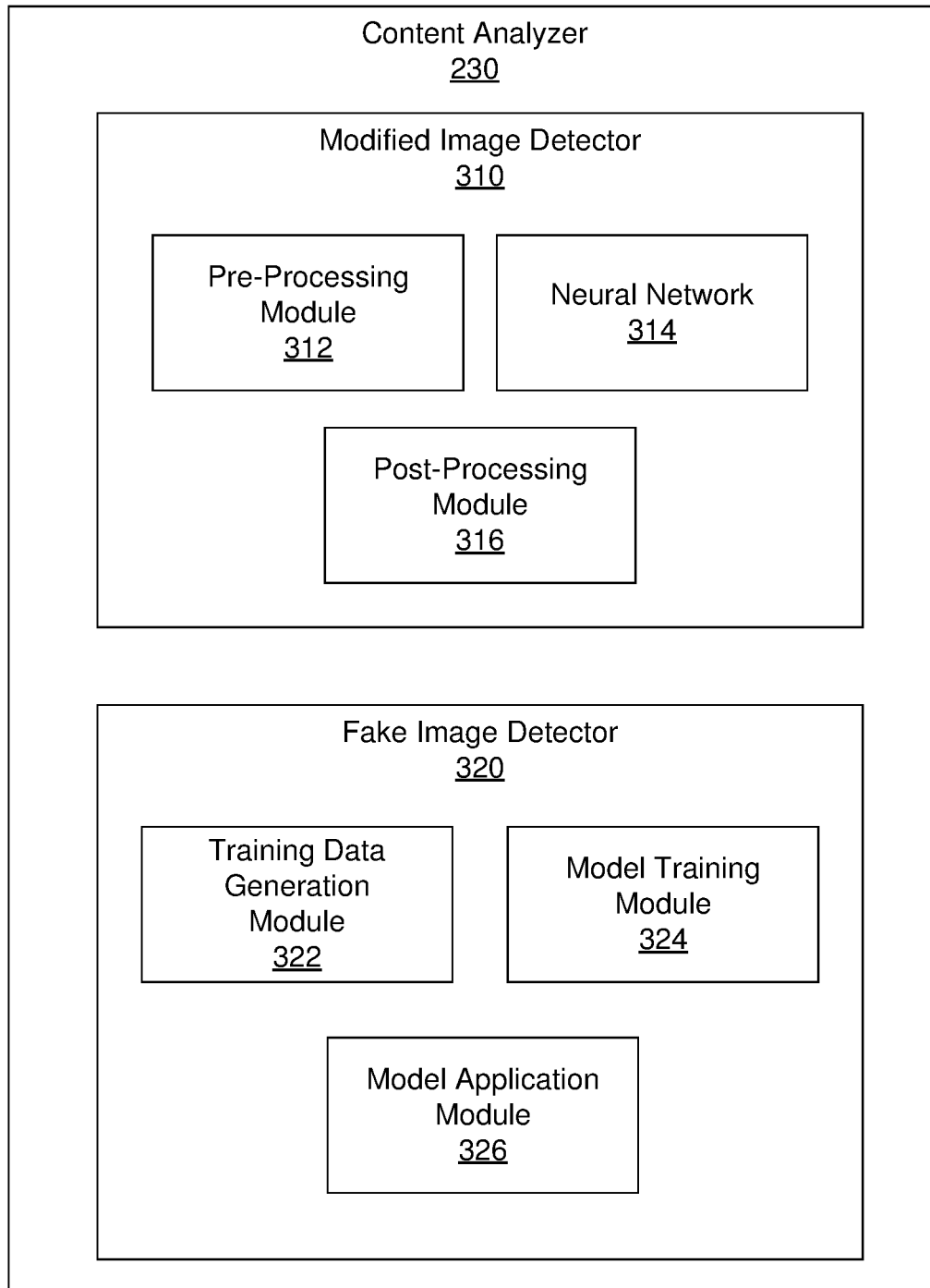
FIG. 3 is a block diagram of the content analyzer shown in FIG. 2, in accordance with an embodiment.

FIG. 3 illustrates an embodiment of the content analyzer 230. In the embodiment shown, the content analyzer includes a modified image detector 310 and a fake image detector 320. The modified image detector 310 analyzes images to identify they have been subject to one or more types of modification. The fake image detector 320 determines whether images have been generated artificially using a model or algorithm. In other embodiments, the content analyzer 230 contains different and/or additional elements. In addition, the functions may be distributed among the elements in a different manner than described. For example, the training of models to detect fake images is described as being performed by the content analyzer, but such training may be performed by another device with the trained model being provided to the content analyzer for deployment.

In the embodiment shown in FIG. 3, the modified image detector includes a pre-processing module 312, a neural network 314, and a post-processing module 316.

The pre-processing module 312 processes images before they are provided as input to the neural network 314. In one embodiment, an input image includes three channels (e.g., red, green, and blue channels). However, the input image may have a different number of channels. For example, a CMYK image has four channels.

The pre-processing module 312 computes JPEG ghosts from the input image at one or more JPEG compression levels. A JPEG ghosts is a visualization of an image that can highlight modified regions. Computation of a JPEG ghost is based on the fact that JPEG images use a quantization table for compression, but different cameras and software suites use different quantization tables. Thus, regions of an image from two different sources are likely to have used different quantization values. A JPEG ghost is a single channel image (e.g., grayscale) in which the pixel intensities provide indications of regions that have been compressed different quantization values (in other words, regions that have been modified). Additional information regarding JPEG ghosts can be found in *Automated Image Forgery Detection through Classification of JPEG Ghosts*, by Fabian Zach, Christian Riess & Elli Angelopoulou, which is incorporated by reference. The pre-processing module 312 adds the JPEG ghosts to the input image as additional channels.

The neural network 314 takes an image (original channels plus the JPEG ghost channel or channels) as input. The neural network 314 is trained to output predictions of whether one or more types of modification are present. The predictions may be Boolean (modification present or not) or may indicate a probability that the modification is present (e.g., a percentage likelihood).

The neural network 314 may be trained using a training set of images that includes positive examples that have been determined (e.g., by a human labelling the image) to include a type of modification for which the neural network 314 is being trained, and, in some embodiments, negative examples that lack the type of modification in question. The training algorithm extracts feature values from the images in the training set, the features being variables deemed potentially relevant to whether or not the images have the type of modification in question. Specifically, the feature values extracted include values of pixels in each channel. An ordered list of the features for an image is herein referred to as the feature vector for the image. In one embodiment, dimensionality reduction is used (e.g., via linear discriminant analysis (LDA), principle component analysis (PCA), or the like) to reduce the amount of data in the feature vectors for images to a smaller, more representative set of data.

The training algorithm uses supervised machine learning to train the neural network 314, with the feature vectors of the positive training set and the negative training set serving as the inputs. For example, backpropagation and gradient descent may be used to minimize the number of errors in the predictions made by the neural network 314. Where the neural network 314 outputs probability, the error may be considered to be the difference between the ground truth (e.g., zero if the modification is not present and one if it is) and the probability outputted by the neural network 314.

In some embodiments, a validation set is formed of additional images, other than those in the training set, which have already been determined to have or to lack type of modification in question. The trained neural network 314 is applied to the images in the validation set to quantify the accuracy of the neural network 314. Metrics applied in accuracy measurement include: Precision=TP/(TP+FP) and Recall=TP/(TP+FN), where precision is how many images the neural network 314 correctly predicted (TP or true positives) out of the total it predicted (TP+FP or false positives), and recall is how many images the neural network 314 correctly predicted (TP) out of the total number of images that did have the modification in question (TP+FN or false negatives). The F score (F-score=2*PR/(P+R)) unifies precision and recall into a single measure. In one embodiment, the neural network 314 is iteratively re-trained until the occurrence of a stopping condition, such as the accuracy measurement indication that the model is sufficiently accurate, or a number of training rounds having taken place.

Regardless of the specifics of how it is trained, the neural network 314 outputs predictions of whether one or more types of input image modification are present in the input image. In one embodiment, the types of modification for which the neural network 314 outputs a prediction include: added text, has been made into a meme, blurring, object insertion, and requantization. An image may be modified to make it into a meme using one or more techniques, such as inserting text with a predetermined font at specified locations (e.g., at the top and bottom of the image), tiling the image to make a comic-strip style meme, inserting predetermined objects (e.g., a troll face), etc. By providing examples of images with each type of modification in the training set, the neural network 314 may be trained to identify the general category of "made into a meme" regardless of which specific technique or techniques were used to modify the image. Additional details of the structure of the neural network, according to various embodiments, are provided below, with reference to FIG. 5.

The post-processing module 316 determines what (if any) further action to take in view of the output from the neural network. In one embodiment, the post-processing module 316 adds metadata to the input image indicating the types of modification identified. This metadata may be presented to users in conjunction with the image and/or cause presentation of supplemental information, such as a warning symbol indicating the image has been modified. Alternatively, users may be restricted or prevented entirely from viewing images with certain metadata. In another embodiment, the post-processing module 316 may queue the input image for human (e.g., a moderator or administrator of the online system 140) review if the neural network 314 identifies certain types of modification. For example, any image in which an object has been inserted might be queued for review. In some embodiments, users may be temporarily prevented from viewing the image until the human review has been completed.

Turning now to the fake image detector 320, the embodiment shown in FIG. 3 includes a training data generation module 322, a model training module 324, and a model application module 326.

The online system 140 typically does not have access to the algorithm or model used to generate the fake images the fake image detector 320 is trying to detect. Furthermore, the online system 140 does not have a priori information regarding the individual depicted in the fake image or the source material used in its creation. Instead, the training data generation module 322 generates training data from images of known individuals (e.g., from images in the content store 210) to use as specific examples in training a model to detect a general class of faked images. In one embodiment, the training data generation module 322 generates training data using a face swapping algorithm to replace the faces of a set of individuals with the faces of other individuals.

The model training module 324 trains a fake image detection model to detect fake image using the same or similar techniques as those used to train the neural network used to identify modified images. The faked images created by the training data generation module 322 can be used as positive examples and other images (e.g., from the content store 210) may be used as negative examples. The negative examples may be the same or different images than those from which the positive examples are generated. The goal of training is to configure the model instances of a general class of fakes (e.g., face-swapped images) based on the specific example included in the generated training set. In one embodiment, the fake image detection model is a neural network. In other embodiments, different types of model may be used, such as support vector machines, gradient boosted decision trees, linear regression, and the like. The generation of training data and training of the fake image detection is described in greater detail below, with reference to FIG. 7.

The model application module 326 applies the fake image detection model to generate a prediction of whether the images are fakes. As described previously, the model application module 326 may analyze images when they are uploaded to the inline system 140, as part of a periodic scanning process, and/or on request from a user. In one embodiment, the fake image detection model takes in image including a face as input and outputs a prediction of whether the face has been changed using a face swapping algorithm. The prediction may be Boolean (face-swapped or not face-swapped) or indicate a likelihood that the image was faked using a face swapping algorithm. In various embodiments, the model application module 326 adds metadata to the image indicating the results of the analysis. For example, any image that has a likelihood of being generated by a face swapping algorithm of greater than a threshold (e.g., 70%) may be tagged as "possibly fake," etc. The model application module 326 may also queue images that are likely fakes for human review.

Example Method for Detecting Modified Images

Figure 4:
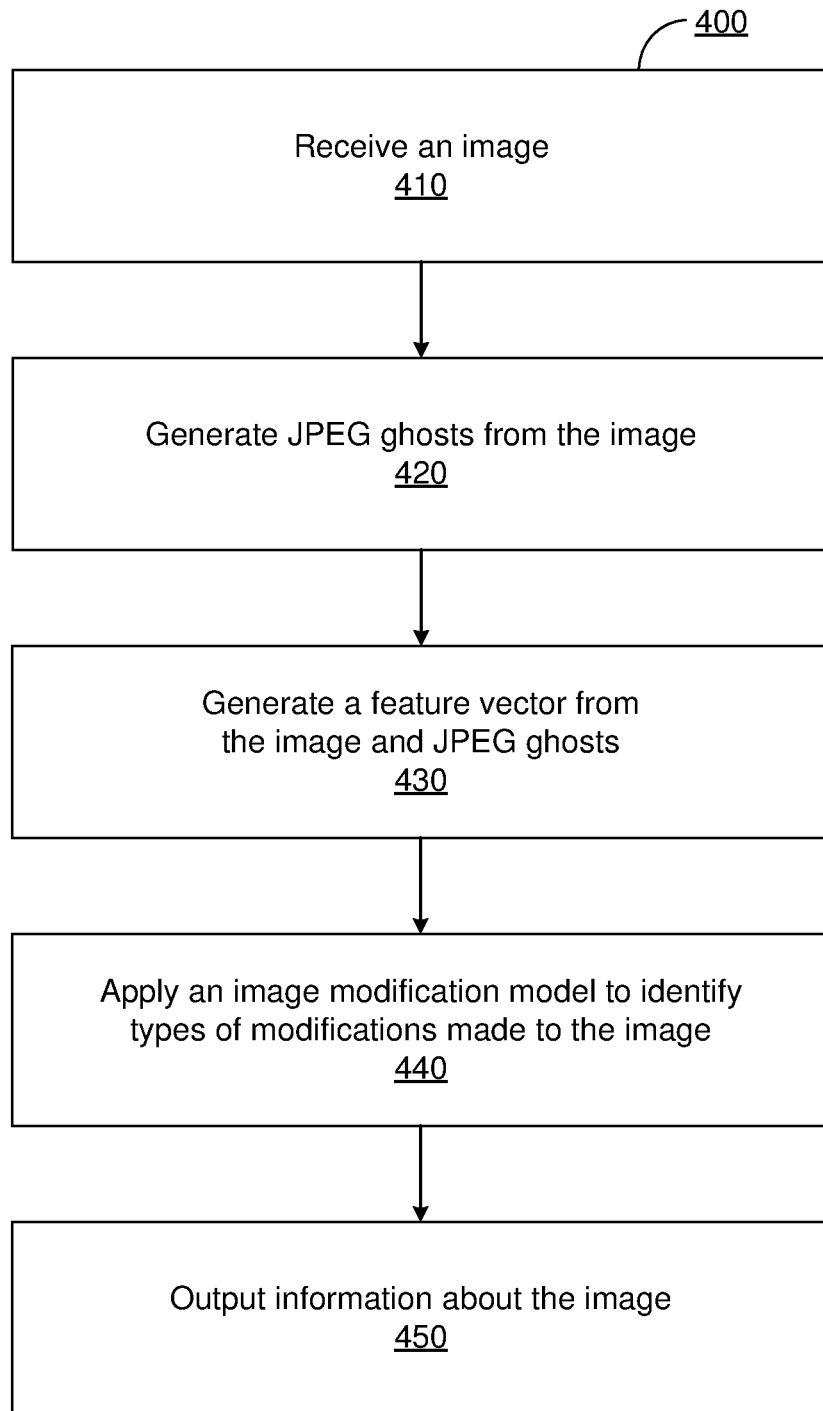
FIG. 4 is a flowchart illustrating a method for determining whether an image has been modified or faked, in accordance with an embodiment.

FIG. 4 illustrates an example method 400 for analyzing an image. The steps of FIG. 4 are illustrated from the perspective of the content analyzer 230 performing the method 400. However, some or all of the steps may be performed by other entities and/or components. In addition, some embodiments may perform the steps in parallel, perform the steps in different orders, or perform different steps.

In the embodiment shown in FIG. 4, the method 400 begins with the content analyzer 230 receiving 410 an image. As noted previously, the content analyzer 230 may receive the image in response to it being uploaded to the online system 140, as part of a periodic analysis of content, or at the request of a user, depending on the specific embodiment.

The pre-processing module 312 generates 420 JPEG ghosts from the image at one or more compression levels. In one embodiment, the image is an RGB image and the pre-processing module 312 generates 420 JPEG ghosts at three compression levels. In other embodiments, the number of channels in the image and/or the number of JPEG ghost channels generated 420 may be different.

Figures 5, 6:
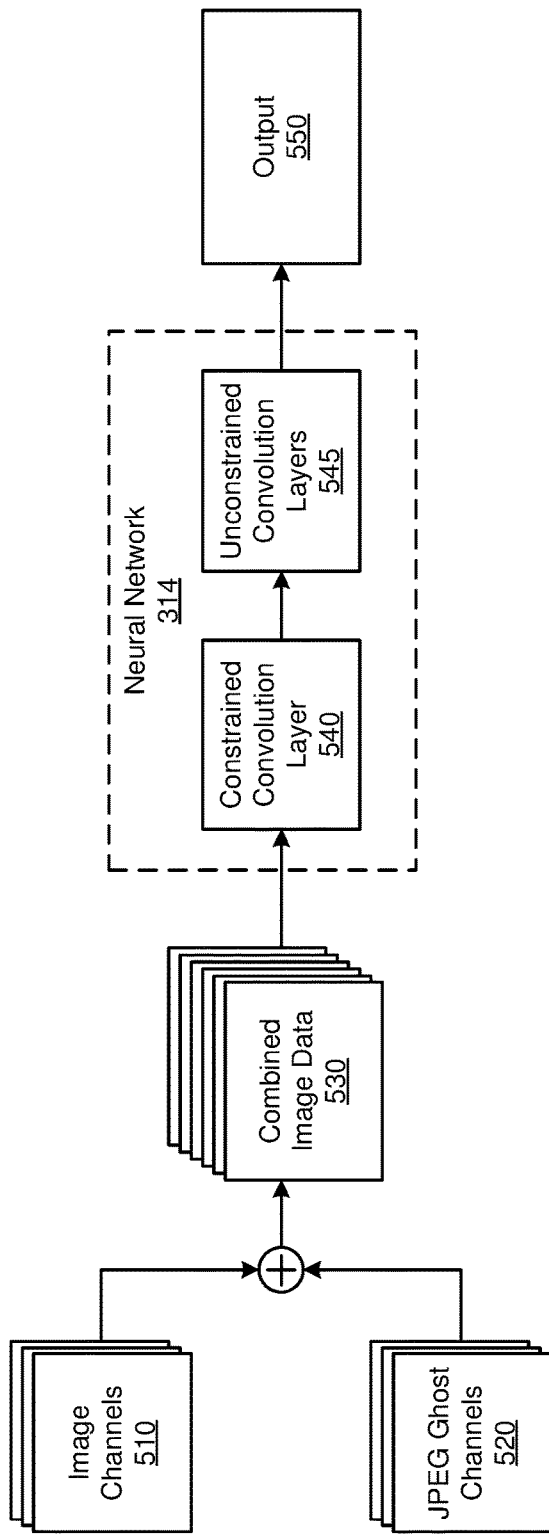
FIG. 5 illustrates an approach to identifying image modifications, in accordance with an embodiment.
FIG. 6 illustrates a convolution filter from a constrained convolution layer, in accordance with an embodiment.

The pre-processing module 312 generates 430 a feature vector for the image. In one embodiment, the feature vector is generated 430 by concatenating the pixel values for each of the image channels with the pixel values of the JPEG ghosts. In the case of an RGB image and three JPEG ghosts, this results in a six-channel image The pre-processing module 320 applies 440 an image modification model (e.g., a neural network) to the feature vector to identify types of modification made to the image. FIG. 5 illustrates an example data flow for applying 440 the image modification model. In the embodiment shown, the image channels 510 are concatenated with one or more JPEG ghost channels to get combined image data 530. In the case where the input image is an RBG image and JPEG ghosts are computed at compression three levels, this results in six channels of combined image data 530.

The combined image data 530 is provided as input to the neural network 314. In various embodiments, the first layer of the neural network 314 is a constrained convolution layer 540 and the neural network 314 also includes one or more unconstrained convolution layers 545. In one such embodiment, the neural network 314 includes four unconstrained convolution layers 545. In other embodiments, the neural network 314 may include additional layers and/or the layers may be arranged in a different order.

The constrained convolution layer 540 suppresses the image content to make it easier to detect traces of image manipulation. In one embodiment, the constrained convolution layer 540 includes a set of convolution filters that are applied to overlapping patches of a predetermined size (e.g., three pixels by three pixels, five pixels by five pixels, etc.) that span the input image. The value of the central element of each convolution filter is forced to take a value of negative one. The remaining element values are collectively constrained such that they sum to one. FIG. 6 illustrates an example three-by-three convolution filter from a constrained convolution layer 540. The central value 610 is negative one while the value of elements 620A through 620H sum to one. Additional details regarding constrained convolution layers 540 can be found in *Constrained Convolutional Neural Networks: A New Approach Towards General Purpose Image Manipulation Detection*, by Belhassen Bayer and Matthew C. Stamm, which is incorporated by reference.

Referring back to FIG. 5, the output from the constrained convolution layer 540 is passed to one or more unconstrained convolution layers 545. The unconstrained convolution layers include convolution filters for which each element can take any value. In one embodiment, the neural network 314 includes four unconstrained convolution layers 545. This may provide a desirable balance between the accuracy and processing speed of the neural network 314. In other embodiments, other numbers of unconstrained convolution layers may be used.

The output 550 from the neural network 314 is provided for presentation and/or further processing. As described previously, in one embodiment, the output 550 is a set of Boolean values indicating whether various types of modification are likely to be present in the input image. In another embodiment, the output 550 is a set of values indicting the likelihood that each of the types of modification is present in the input image.

Referring back to FIG. 4, the illustrated embodiment of the method 400 concludes with the content analyzer 230 outputting 450 information about the image. This may include displaying the results on a screen or other display, tagging the image with metadata indicating any modification types detected, tagging the image with metadata indicating how it has been modified, etc. In other embodiments, the content analyzer 230 may output 450 information about the image as it is generated. The content analyzer may also take other action based on the output of the image modification model, such as queueing images for human review, deleting images, and the like.

Example Method for Detecting Fake Images

As described previously, the content analyzer 230 may additionally or alternatively include a fake image detector 320 that applies an image fake model to determine whether an input image has been faked. In one embodiment, the image fake model is a neural network that takes the original input image (not including the JPEG ghost channels) as input. Obtaining training data for the image fake model is a challenge as the fake image detector 320 typically does not have access to the generator that was used to create the image (assuming it is a fake).

Figure 7A:
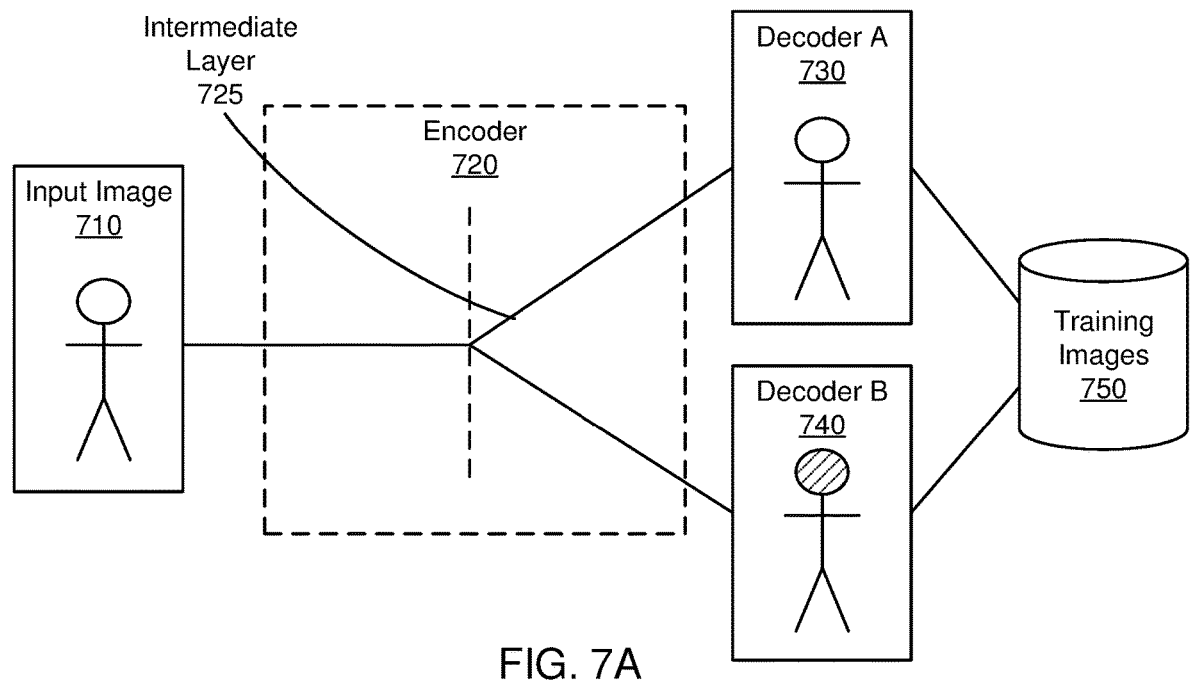
FIG. 7A illustrates an approach for generating training for a fake detection model, in accordance with an embodiment.

FIG. 7A illustrates an approach for generating training data for the fake image model. In the embodiment shown, an input image 710 is provided as input to an encoder 720. The image 710 depicts one of two people, person A or person B. The encoder 720 encodes the image 710 and passes the encoded image data to each of a pair of decoders 730, 740. The combination of an encoder 720 and a pair of decoders 730, 740 may be referred to as an autoencoder for convenience.

The first decoder 730 attempts to fit person A's face to the image and the second decoder 740 tries to fit person B's face to the image. In one embodiment, the encoder 720 includes an intermediate layer 725 that restricts how the input image 710 is encoded. Thus, both face-swapped and unface-swapped images will include artifacts from the encoding and decoding process. This may prevent the image fake model from "cheating" by learning to identify such artifacts rather than indicators of the face-swapping process itself. Regardless of the specific structure of the encoder 720, if the input image 710 depicts person A the output from the first decoder 730 should be substantially unchanged from the input image (except for any encoding/decoding artifacts) while the output from the second decoder 740 should include person B's face on person A's body. Conversely, if the input image depicts person B, the output from the second decoder 740 should match the input image and the output from the first decoder should include person A's face on person B's body.

Because the first decoder 730 should not substantially change images that already depict person A's face, any differences between an input image 710 depicting person A's face and the output of the first decoder may be used as an error function to adjust the weights of the first decoder. Thus, over time, the first decoder 730 is trained to overfit to person A's face such that, even when the input image 710 depicts person B, the first decoder 730 reconstructs details that are similar to person A's face. Similarly, input images 710 depicting person B may be used to overfit the second decoder 740 to always reconstruct an output image with details that are similar to person B's face. Once the decoders 730, 740 have been trained, they may be used to generate a set of face-swapped images from images of person A and person B. The face-swapped (fake) and substantially unchanged (real) images generated from each input image 710 may be stored as training images 750 in a data store.

The approach illustrated by FIG. 7A may be used to generate face-swapped and substantially unchanged images for multiple (e.g., thousands of) pairs of people. The model training module 324 may use these face-swapped images as positive examples and images that have not been face swapped as negative examples to train an image fake model to classify input images as faked (face-swapped) or not faked (not face-swapped). This may be a Boolean determination (fake or not fake) or the model may output a probability that the image has been created using a face swapping algorithm.

Figure 7B:
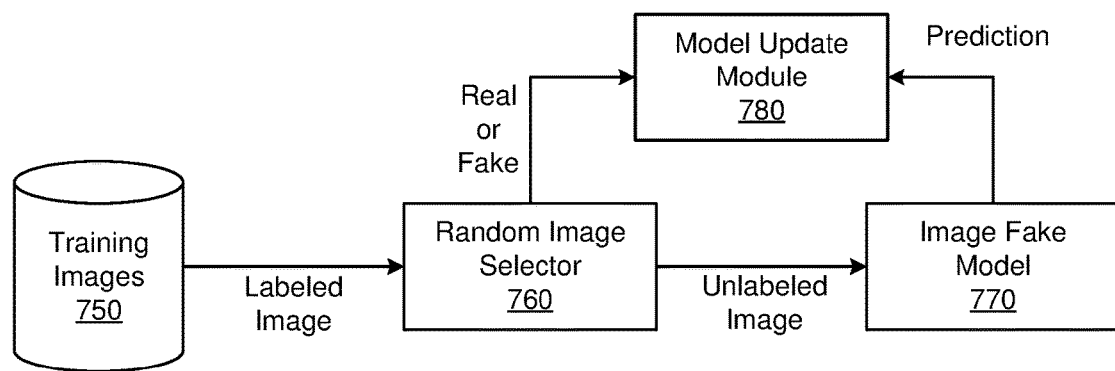
FIG. 7B illustrates an approach for training a discriminator using training data generated using the approach of FIG. 7A, in accordance with an embodiment.

FIG. 7B illustrates an example approach for training the image fake model 770, in accordance with one embodiment. Training images 750 (e.g., generated using an autoencoder, as described above with reference to FIG. 7A) are retrieved from the data store. The training images include both real and fake images and are labeled accordingly. A random image selector 760 separates the labels from images and provides images an input to the image fake model 770 and the corresponding label to a model update module 780. In one embodiment, the random image selector 760 provides images one at a time as input to the image fake model 770 in a random order. Alternatively, the random image selector may alternate between real and fake images.

The image fake model 770 generates a prediction regarding whether an input image is fake or real. The prediction may be Boolean (fake or real) or a probability that the image is fake. The prediction is provided to the model update module 780 that compares it to the corresponding label provided by the random image selector. Thus, the model update module 780 can determine whether the prediction generated by the image fake module 770 is correct (in the case of a Boolean prediction) or a difference between the prediction and the ground truth label (in the case of a probability prediction). In either case, the model update module 780 may use differences between the labels and the predictions as a cost function to train the image fake model 770 (e.g., using backpropagation).

If the training images 750 are generated from a sufficiently large number of pairs of people, the image fake model 770 may be trained to discriminate between the general classes of face-swapped and not face-swapped. Thus, the trained image fake model 770 may be applied to determine whether a given input image that was not in the training data has been faked. Therefore, assuming training was successful, the image fake model may accurately identify fake images generated using a face swapping algorithm, even without access to the particular algorithm used to generate the fake image.

The content analyzer 230 may output information about the image based on application of the image fake model 770. This may include displaying the results on a screen or other display, tagging the image with metadata indicating the image is faked, queueing the image for human review, deleting the image, etc. In other embodiments, the content analyzer 230 may output information about the image as it is generated.

Example Computing System Architecture

Figure 8:
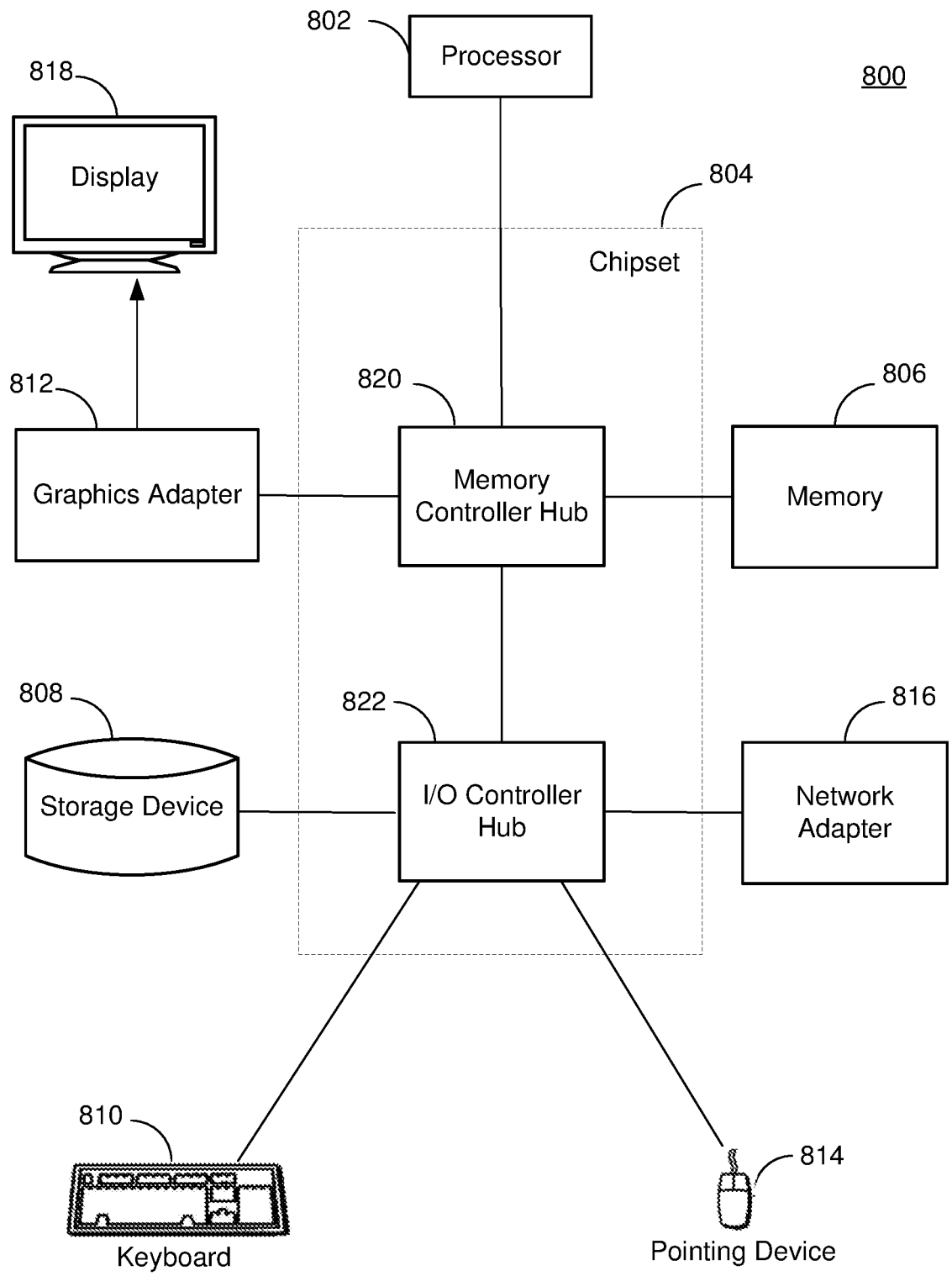
FIG. 8 illustrates a computer suitable for use in the system environment of FIG. 1, in accordance with an embodiment.

FIG. 8 is a high-level block diagram illustrating an example computer 800 suitable for use as a client device 110, third-party system 130, or server in the online system 140. The example computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touch-screen, or other type of pointing device, and is used in combination with the keyboard 810 (which may be an on-screen keyboard) to input data into the computer system 800. The graphics adapter 812 displays images and other information on the display 818. The network adapter 816 couples the computer system 800 to one or more computer networks.

The types of computers used by the entities of FIGS. 1 through 3 can vary depending upon the embodiment and the processing power required by the entity. For example, the online system 140 might include a distributed database system comprising multiple servers working together to provide the functionality described. Furthermore, the computers can lack some of the components described above, such as keyboards 810, graphics adapters 812, and displays 818.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving an image;
   generating one or more JPEG ghosts from the image;
   generating a feature vector from the image and the JPEG ghosts;
   providing the feature vector as input to a neural network, the neural network including a constrained convolution layer and a plurality of unconstrained convolution layers, wherein the constrained convolution layer includes a plurality of convolution filters, each convolution filter including a central element value and a plurality of other element values, the central element value being a first predetermined value and the other element values summing to a second predetermined value;

generating, by the neural network, an output from the feature vector, the output including an indication of whether a type of modification is present in the image; and associating metadata with the image indicating whether the type of modification is present in the image based on the output of the neural network.

2. The method of claim 1, wherein the one or more JPEG ghosts includes a plurality of JPEG ghosts, each JPEG ghost of the plurality computed using a different JPEG compression level.

3. The method of claim 1, wherein the image includes a plurality of channels and generating the feature vector comprises concatenating pixel values of the plurality of channels with pixel values of the one or more JPEG ghosts.

4. The method of claim 1, wherein the output from the neural network includes a probability that the type of modification is present in the image, and the metadata is added to the image if the probability exceeds a threshold.

5. The method of claim 1, wherein the constrained convolution layer is a first layer of the neural network.

6. The method of claim 1, wherein the output from the neural network identifies whether each of a plurality of types of modification are present in the image and the metadata indicates whether each of the plurality of types of modification are present in the image.

7. The method of claim 6, wherein the plurality of types of modification include addition of text, having been made into a meme, blurring, object insertion, or requantization.

8. The method of claim 1, wherein the first predetermined value is negative one and the second predetermined value is one.

9. A non-transitory computer-readable medium storing instructions that, when executed by one or more processors, cause the one or more processors to perform operations comprising:

receiving an image;
generating one or more JPEG ghosts from the image;
generating a feature vector from the image and the JPEG ghosts;
providing the feature vector as input to a neural network, the neural network including a constrained convolution layer and a plurality of unconstrained convolution layers, wherein the constrained convolution layer includes a plurality of convolution filters, each convolution filter including a central element value and a plurality of other element values, the central element value being a first predetermined value and the other element values summing to a second predetermined value;

generating, by the neural network, an output from the feature vector, the output including an indication of whether a type of modification is present in the image; and associating metadata with the image indicating whether the type of modification is present in the image based on the output of the neural network.

10. The non-transitory computer-readable medium of claim 9, wherein the one or more JPEG ghosts includes a plurality of JPEG ghosts, each JPEG ghost of the plurality computed using a different JPEG compression level.

11. The non-transitory computer-readable medium of claim 9, wherein the image includes a plurality of channels and generating the feature vector comprises concatenating pixel values of the plurality of channels with pixel values of the one or more JPEG ghosts.

12. The non-transitory computer-readable medium of claim 9, wherein the output from the neural network includes a probability that the type of modification is present in the image, and the metadata is added to the image if the probability exceeds a threshold.

13. The non-transitory computer-readable medium of claim 9, wherein the constrained convolution layer is a first layer of the neural network.

14. The non-transitory computer-readable medium of claim 9, wherein the output from the neural network identifies whether each of a plurality of types of modification are present in the image and the metadata indicates whether each of the plurality of types of modification are present in the image.

15. The non-transitory computer-readable medium of claim 14, wherein the plurality of types of modification include addition of text, having been made into a meme, blurring, object insertion, or requantization.

16. The non-transitory computer-readable medium of claim 9, wherein the first predetermined value is negative one and the second predetermined value is one.

* * * * *